United States Patent
Weihrauch

(10) Patent No.: US 7,851,963 B2
(45) Date of Patent: Dec. 14, 2010

(54) ROTOR OF AN ELECTRICAL MACHINE AND MOTOR WITH SUCH A ROTOR

(75) Inventor: Niels Christian Weihrauch, Flensburg (DE)

(73) Assignee: Danfoss Compressors GmbH, Flensburg (DE)

( * ) Notice: Subject to any disclaimer, the term of this patent is extended or adjusted under 35 U.S.C. 154(b) by 0 days.

(21) Appl. No.: 12/401,690

(22) Filed: Mar. 11, 2009

(65) Prior Publication Data

US 2009/0236929 A1 Sep. 24, 2009

(30) Foreign Application Priority Data

Mar. 20, 2008 (DE) .................. 10 2008 015 327

(51) Int. Cl.
*H02K 1/00* (2006.01)
*H02K 19/00* (2006.01)
*H02K 17/00* (2006.01)

(52) U.S. Cl. .................. 310/216.001; 310/69; 310/162; 310/211

(58) Field of Classification Search .................. 310/69, 310/71, 211, 216, 217, 162
See application file for complete search history.

(56) References Cited

U.S. PATENT DOCUMENTS

| | | | | |
|---|---|---|---|---|
| 1,554,702 A | * | 9/1925 | Bergman | 310/211 |
| 2,292,168 A | * | 8/1942 | Smith | 310/212 |
| 4,139,790 A | * | 2/1979 | Steen | 310/156.83 |
| 4,801,832 A | * | 1/1989 | Neumann | 310/216.111 |
| 4,845,837 A | * | 7/1989 | Lloyd | 29/598 |
| 7,425,786 B2 | * | 9/2008 | Hino et al. | 310/156.57 |

FOREIGN PATENT DOCUMENTS

| | | | |
|---|---|---|---|
| DE | 692 06 626 T2 | | 4/1996 |
| EP | 880216 A1 | * | 11/1998 |
| JP | 55127863 A | * | 10/1980 |

OTHER PUBLICATIONS

Machine Translation EP880216 A1 (1998).*
Derwent Translation (Abstract and Constitution) JP55127863 (1980).*

* cited by examiner

*Primary Examiner*—Quyen Leung
*Assistant Examiner*—Jose A Gonzalez Quinones
(74) *Attorney, Agent, or Firm*—McCormick, Paulding & Huber LLP

(57) ABSTRACT

The invention concerns a rotor of an electrical machine, particularly a driving motor for a hermetically enclosed refrigerant compressor with a body (4) comprising a magnetically conductive material, the rotor having a plurality of axially extending slots (5, 6), which are filled with an electrically conductive material. It is endeavored to achieve a good performance. For this purpose, it is ensured that an extension section (7) of a first group of slots (5) extends further radially inwards than a second group of slots (6), and that between two slots (5) of the first group at least one slot (6) of the second group must be arranged, a first flow cross-section being formed between neighboring extension sections (7) at the circumferentially shortest distance (a) between the two extension sections (7), a second flow cross-section being formed between neighboring slots (5, 6) at the circumferentially shortest distance (b) between the slots (5, 6), the first flow cross-section corresponding to the sum of the second flow cross-sections between the two slots (5) of the first group.

12 Claims, 3 Drawing Sheets

ROTOR OF AN ELECTRICAL MACHINE AND MOTOR WITH SUCH A ROTOR

CROSS REFERENCE TO RELATED APPLICATION

Applicant hereby claims foreign priority benefits under U.S.C. § 119 from German Patent Application No. 10 2008 015 327.3 filed on Mar. 20, 2008, the contents of which are incorporated by reference herein.

FIELD OF THE INVENTION

The invention concerns a rotor of an electrical machine, particularly a driving motor for a hermetically enclosed refrigerant compressor with a body comprising a magnetically conductive material, the rotor having a plurality of axially extending slots, which are filled with an electrically conductive material.

BACKGROUND OF THE INVENTION

Such a rotor is, for example, known from DE 692 06 626 T2.

With such a rotor, a yoke is formed radially inside the slots, said yoke serving as path for the magnetic flux. Radially inside, the yoke is limited by a bore serving as accommodation for the rotor shaft. If a rotor shaft with a small diameter is used, the bore can accordingly be made smaller. In this case, a relatively large yoke is available, which is not required for magnetic reasons.

Theoretically, the space thus being available, could then be used to extend the slots radially inwards, thus providing a larger line cross-section for the electrical current. The extension of the slots radially inwards, however, has the disadvantage that the slots will be heavily narrowed at the radial inner end. In this case, it will practically not be possible, at least with a defensible effort, to fill the slots completely with an electrically conducting material. Air cavities and other interferences could occur, which could again have a negative effect on the operation behaviour of the machine and reduce the performance.

The problem will be discussed on the basis of FIGS. 7 and 8: If, as shown in FIG. 7, the slots in the rotor are extended radially inwards, this results in a very narrow slot bottom, which can no longer be reasonably filled with electrically conductive material. The limitation of the individual slot in the circumferential direction is pre-specified in that a rotor tooth remaining between two slots must have a certain width, in order to provide a sufficient flow path for the magnetic flux. If, as shown in FIG. 8, these limitations in the circumferential direction would be further extended inwards, a slot would occur, which would geometrically consist of two separate bodies. Logically, this is not a suitable solution.

SUMMARY OF THE INVENTION

The invention is based on the task of designing a rotor in such a manner that a good performance is achieved in the electrical machine.

With a rotor of the kind mentioned in the introduction, this task is solved in that an extension section of a first group of slots extends further radially inwards than a second group of slots, and that between two slots of the first group at least one slot of the second group must be arranged, a first flow cross-section being formed between neighbouring extension sections at the circumferentially shortest distance between the two extension sections, a second flow cross-section being formed between neighbouring slots at the circumferentially shortest distance between the slots, the first flow cross-section corresponding to the sum of the second flow cross-sections between the two slots of the first group.

This embodiment provides an optimisation of the electrical and magnetic conditions. The extension makes it possible to design the cross-section of the slot so that it can easily be filled with the electrically conductive material. On the other hand, it is ensured that the magnetic flux can be guided with only little interference. The magnetic flux meets practically the same flow cross-section between neighbouring slots as between neighbouring extension sections. The cross-section for the magnetic flux must not be the same in the exact mathematical sense. Small deviations of, for example, ±10% are permissible, as long as the magnetic flux is not exposed to heavy interferences. The extension of a part of the slots permits a large number of slots to be maintained, as sufficient flow cross-section is still available radially inside the rotor. If all slots were extended further radially inwards, the cross-section available radially inside would be so heavily reduces that the electrically conductive material could no longer fill the slots with the required reliability, and the number of slots would have to be reduced. The extensions of the slots, which are filled with electrically conductive material, reduce the electrical resistance of the short-circuit rotor, at which the conductors formed in the slots by the electrically conductive material are connected to each other by short-circuit rings at both front sides. However, the radial magnetic flux path in the body is not, or not significantly, reduced, so that no additional losses are generated.

Preferably, the slots of the first group in the radial direction are 20 to 50% longer than the slots of the second group. Thus, the space available radially inside is utilised to an optimum. On the one hand, the line cross-section available for the electrical current is optimised. On the other hand, the flow cross-section available for the magnetic flux is not reduced in an interfering manner.

In a preferred embodiment it is ensured that neighbouring extension sections have neighbouring limiting walls, which extend in parallel to each other over at least 50% of the radial extension of the extension section. Also here it may be advantageous, if the walls are parallel to each other over practically the whole radial extension of the extension section, apart from the end sections of the extension sections radially inside and radially outside. Also in this manner it can be achieved that over a certain radial extension a constant flow cross-section is available for the magnetic flux, so that interferences of the magnetic flux are avoided. Also here again it is advantageous if the shortest distance is arranged in the area of the walls extending in parallel. The magnetic flow cross-section is kept constant in this area, so that here interferences of the magnetic flux cannot appear. This further improves the operational behaviour of the rotor.

Preferably, the extension sections have a cross-section, which is so large that a circle with a diameter of at least 2 mm fits in. This embodiment is particularly advantageous, if the slots are filled with electrically conductive material. In this case, the risk is avoided that hollows are formed, which would increase the electrical resistance and reduce the performance of the motor.

It is preferred that the cross-section has corners with a radius of at least 0.4 mm. This is particularly advantageous, if the core of the rotor is made of punched laminations.

Preferably, the slots of the first group taper radially inwards in the circumferential direction and expand again in the area of the extension section in the circumferential direction. This embodiment makes it particularly easy to adapt the first flow cross-section to the sum of the second flow cross-sections.

It is preferred that a transition from the extension section into the rest of the slot of the first group occurs with an arc. This embodiment has two advantages. Firstly the arc-shaped transition provides that an interference of the magnetic flux is kept small or even completely avoided. Secondly, the arc-shaped transition provides improved conditions, if the slots are filled with an electrically conductive material, for example aluminium or copper.

Preferably, the slots of the second group have radially inside an arc-shaped stop, the transition extending at least partly in parallel to the end. Thus, also in the area of the radial inner end of the slots of the second group a harmonic course occurs for the magnetic flux, which is here exposed to a substantially constant flow cross-section. This is particularly easily achieved, if the arc-shaped end has a circular shape und the transition also partially follows a circular shape.

Preferably, a slot of the second group is arranged between any two slots of the first group. Thus, the slots of the first group and the slots of the second group are alternating. This results in optimum conditions. In spite of the extension of some slots a radial inside narrowing of the cross-section does not occur, which would make a complete filling of the slots more difficult. Accordingly, a large number of slots can be maintained.

In an alternative embodiment it may be ensured that two slots of the second group are arranged between any two slots of the first group. Thus, only every third slot is extended inwards in the radial direction. This still gives favourable conditions.

The invention also concerns an electric motor with such a rotor.

It is preferred that a relation between the number of slots in the rotor and the number of stator teeth amounts to 28:24. For example, 14 slots of the first group and 14 slots of the second group can be used together with 24 stator teeth. This results in very small harmonic losses. Other alternatives are relations of 20:24, 32:24 or 14:12.

Alternatively, it may be ensured that the relation between the number of slots in the rotor and the number of stator teeth amounts to 27:24. This gives optimum conditions. Other relations between the number of slots and the number of stator teeth can be used without problems in connection with the slots being differently long in the radial direction.

BRIEF DESCRIPTION OF THE DRAWINGS

In the following, the invention is described on the basis of preferred embodiments in connection with the drawings, showing.

DETAILED DESCRIPTION OF THE PREFERRED EMBODIMENTS

Figure 4:
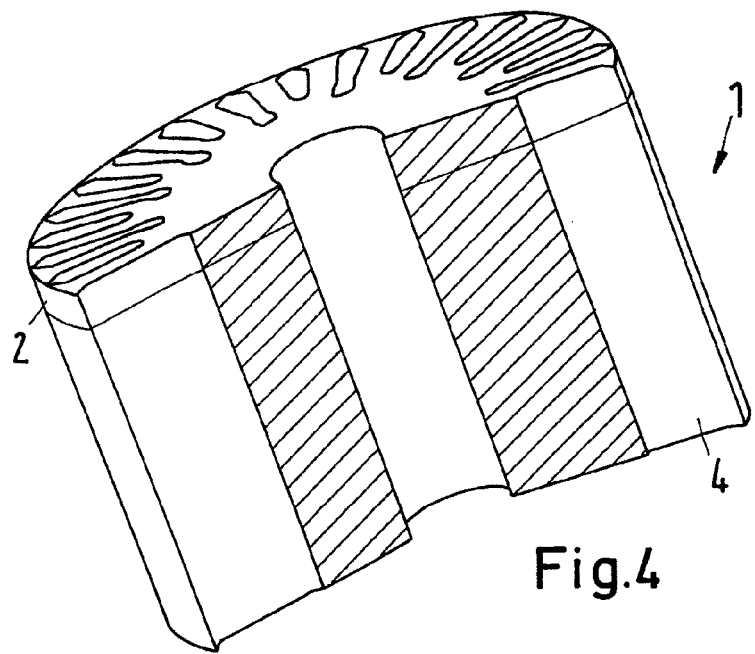
FIG. 4 is a perspective view of the rotor, partially in section.

A rotor 2 of an electric machine is made as a short-circuit rotor. It is, for example, made of a plurality of punched metal laminated sheets 2, of which one is shown in FIG. 4 with an excessively large thickness. However, it can also be made in different ways. The rotor has a central bore 3, which will eventually adopt the rotor shaft.

The metal laminated sheets 2 form a body 4, which is magnetically conductive. The body 4 has a plurality of slots 5, 6, which are distributed in the circumferential direction. Each slot 5, 6 is filled with an electrically conductive material. This material can, for example, be aluminium, which is filled into the slots 5, 6 in a fluid form, and then solidifies there. Thus, the slots 5, 6 are completely filled with electrically conductive material. The electrically conductive material then forms an electrical conductor. The electrical conductors in all slots 5, 6 are connected to each other at both front sides of the rotor by means of short-circuit rings, which are not shown in detail.

Compared with traditional bores, the bore 3 has a somewhat reduced diameter. Such a rotor for a drive motor of a hermetically enclosed refrigerant compressor usually has central opening with a diameter of 18 mm. In the present case, this diameter is reduced to 15 mm.

It can be seen that the slots 5, 6 have different radial extensions. In order to simplify the description, the slots 5, 6 are divided into two groups. The slots 5 form the first group. The slots 6 form the second group. The slots 5 of the first group extend radially further inwards than the slots 6 of the second group.

This extension is caused by an extension section 7.

All slots 5, 6 taper radially inwards in the circumferential direction. Radially inside, the slots 6 of the second group end in a stop 8, whose cross-section has a circular shape. The slots 5 of the first group, however, extend into the extension section 7, a transition 9 having the shape of an arc.

The extension sections 7 of neighbouring slots 5 of the first group have neighbouring walls 10, 11, which extend in parallel to each other. In the area of these walls 10, 11 extending in parallel, the two extension sections 7 have a shortest distance a in the circumferential direction, said distance forming a first flow cross-section for the magnetic flux.

Further, neighbouring slots 5, 6 also have neighbouring walls 12, 13, which also extend in parallel to each other. The radial extension of these walls 12, 13 amounts to at least 50% of the radial extension of the slots 6 of the second group.

In the circumferential direction, the walls 12, 13 have a distance b, which corresponds to the smallest distance between neighbouring slots 5, 6. The distance b defines a second flow cross-section for the magnetic flux.

The extension sections 7 are now dimensioned and arranged in such a manner that $$a = 2 \times b$$

applies.

In this case equality in the exact mathematical sense is not required. Deviations of a few percent, particularly maximum 10%, preferably maximum 5%, are permissible without problems.

The stop 8 and the neighbouring transition 9 also extend substantially in parallel, so that the magnetic flux meets a practically constant flow cross-section between two slots 5 of the first group. In this way, the magnetic flux is practically not disturbed.

Each extension section 7 is made so that a circle 14 with a diameter of at least 2 mm fits in. This size ensures that the electrically conductive material can be moulded in the slots 5 without hollows or cavities.

In the radial direction, the slots 5 of the first group are 20 to 50% longer than the slots 6 of the second group.

Figure 1:
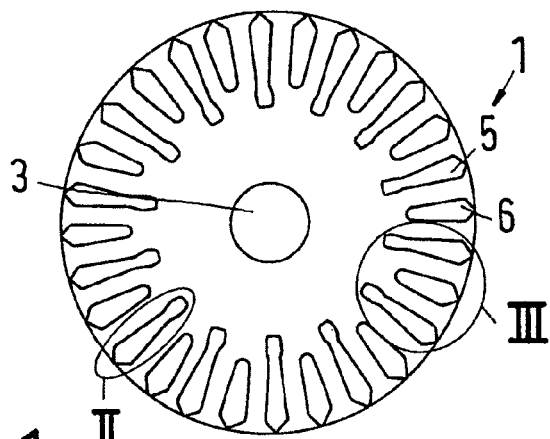
FIG. 1 is a cross-section through a rotor.
Figure 2:
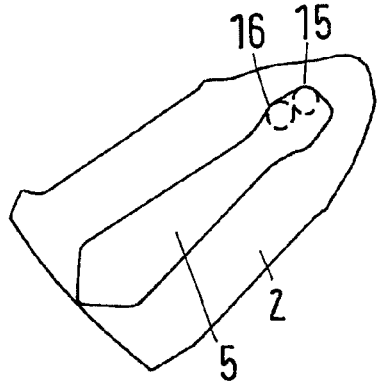
FIG. 2 is an enlargement of a detail II according to FIG. 1.
Figure 3:
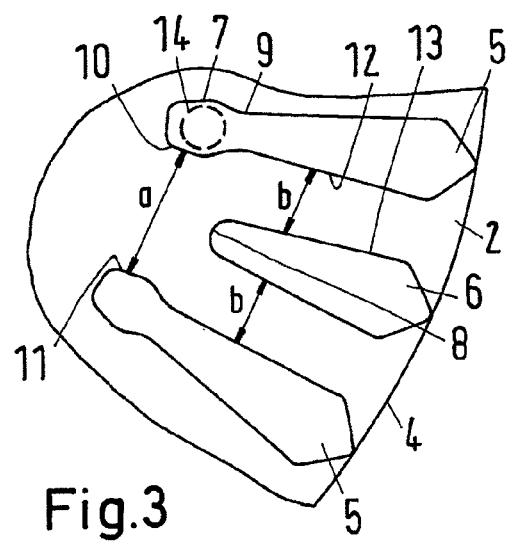
FIG. 3 is an enlargement of a detail III according to FIG. 1.

As can be seen from FIG. 2, all corners 15, 16 of the extension sections 7 are made with radii of at least 0.4 mm. Preferably, 0.6 mm.

If such a rotor 1, as shown, is provided with fourteen slots 5 of the first group and fourteen slots 6 of the second group, and is used with a stator that has twenty-four stator teeth, this results in very small harmonic losses. Similar conditions occur with 20:24, 32:24 or 14:12 slots in the rotor in relation to the stator teeth.

Figure 5:
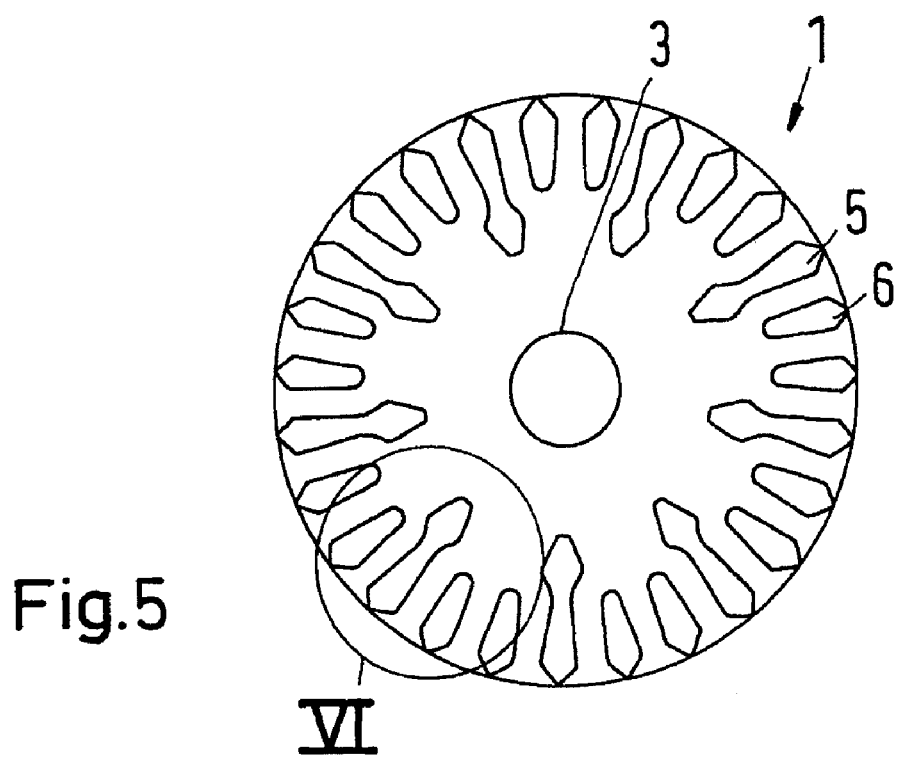
FIG. 5 is a cross-sectional view of a rotor of a second embodiment.
Figure 6:
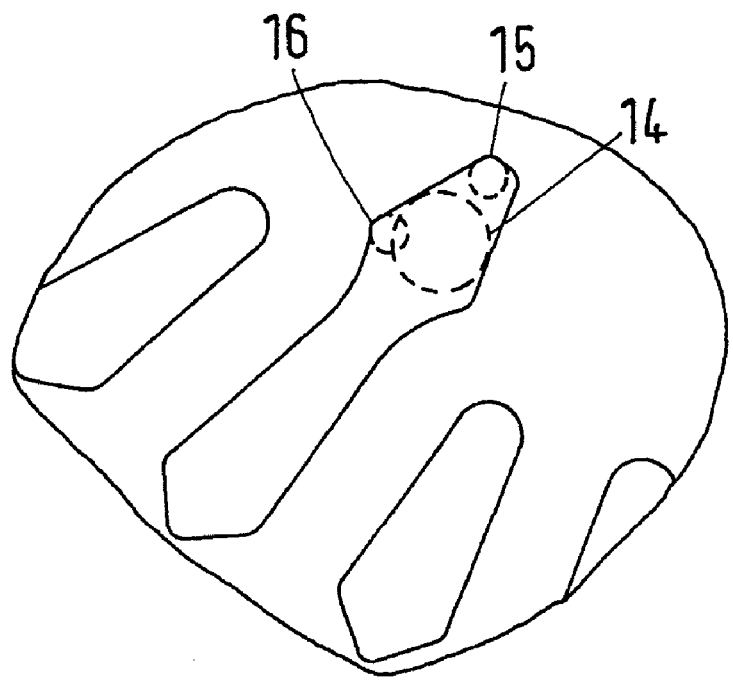
FIG. 6 is an enlargement of a detail VI according to FIG. 5.
Figure 7:
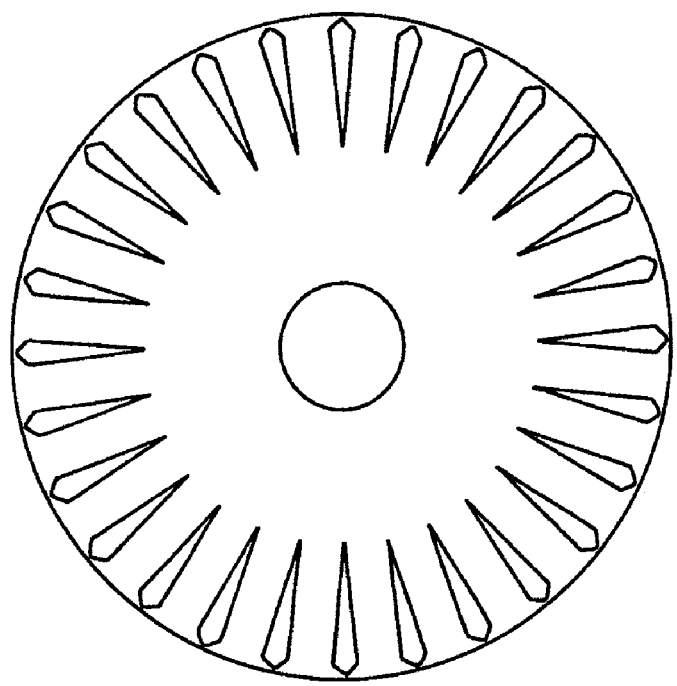
FIG. 7 is a schematic view explaining the problem.
Figure 8:
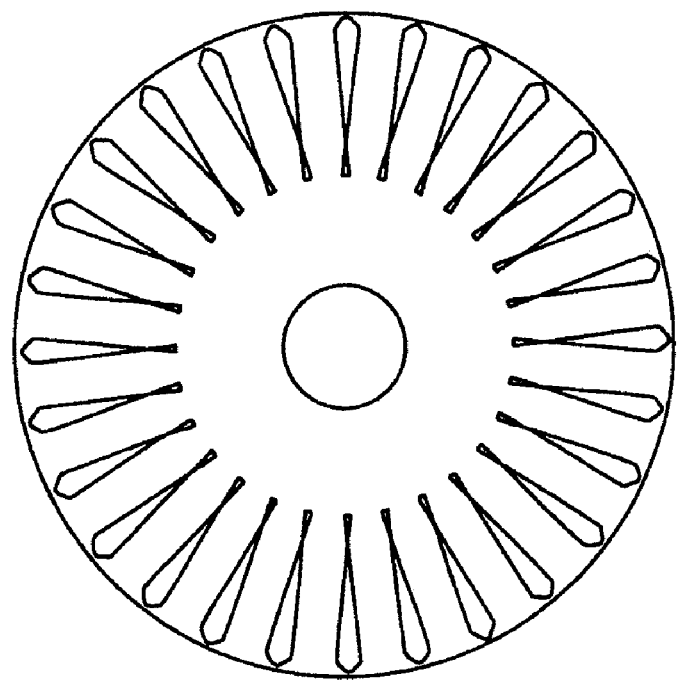
FIG. 8 is a further, similar view.

FIGS. 5 and 6 show a modified embodiment, in which the same elements have the same reference numbers. The essential difference is that here, there are two slots 6 of the second group 6 between any two slots 5 of the first group, so that only every third slot 5 belongs to the first group. Further, 27 slots 5, 6 are provided, that is, 9 slots 5 of the first group and 18 slots 6 of the second group.

It is common for all slots 5, 6 that radially outside they end with a tip, as known per se.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A rotor of an electrical machine, particularly a driving motor for a hermetically enclosed refrigerant compressor with a body comprising a magnetically conductive material, the rotor having a plurality of axially extending slots, which are filled with an electrically conductive material, wherein an extension section of a first group of slots extends further radially inwards than a second group of slots, and that between two slots of the first group at least one slot of the second group must be arranged, a first flow cross-section being formed between neighbouring extension sections at the circumferentially shortest distance (a) between the two extension sections, a second flow cross-section being formed between neighbouring slots at the circumferentially shortest distance (b) between the slots, the first flow cross-section corresponding to the sum of the second flow cross-sections between the two slots of the first group, wherein in the radial direction the slots of the first group are 20% to 50% longer than the slots of the second group.

2. The rotor according to claim 1, wherein neighbouring extension sections have neighbouring limiting walls, which extend in parallel to each other over at least 50% of the radial extension of the extension sections.

3. A rotor of an electrical machine, particularly a driving motor for a hermetically enclosed refrigerant compressor with a body comprising a magnetically conductive material, the rotor having a plurality of axially extending slots, which are filled with an electrically conductive material, wherein an extension section of a first group of slots extends further radially inwards than a second group of slots, and that between two slots of the first group at least one slot of the second group must be arranged, a first flow cross-section being formed between neighbouring extension sections at the circumferentially shortest distance (a) between the two extension sections, a second flow cross-section being formed between neighbouring slots at the circumferentially shortest distance (b) between the slots, the first flow cross-section corresponding to the sum of the second flow cross-sections between the two slots of the first group, wherein the extension sections have a cross-section, which is so large that a circle with a diameter of at least 2 mm fits in.

4. The rotor according to claim 3, wherein the cross-section has corners with a radius of at least 0.4 mm.

5. A rotor of an electrical machine, particularly a driving motor for a hermetically enclosed refrigerant compressor with a body comprising a magnetically conductive material, the rotor having a plurality of axially extending slots, which are filled with an electrically conductive material, wherein an extension section of a first group of slots extends further radially inwards than a second group of slots, and that between two slots of the first group at least one slot of the second group must be arranged, a first flow cross-section being formed between neighbouring extension sections at the circumferentially shortest distance (a) between the two extension sections, a second flow cross-section being formed between neighbouring slots at the circumferentially shortest distance (b) between the slots, the first flow cross-section corresponding to the sum of the second flow cross-sections between the two slots of the first group, wherein the slots of the first group taper radially inwards in the circumferential direction and expand again in the area of the extension section in the circumferential direction.

6. The rotor according to claim 5, wherein a transition from the extension section into the rest of the slot of the first group occurs with an arc.

7. The rotor according to claim 6, wherein the slots of the second group have radially inside an arc-shaped end, the transition extending at least partly in parallel to the end.

8. The rotor according to claim 1, wherein one slot of the second group is arranged between any two slots of the first group.

9. The rotor according to claim 1, wherein two slots of the second group are arranged between any two slots of the first group.

10. An electric motor with a rotor according to claim 1.

11. The electric motor according to claim 10, wherein a relation between the number of slots in the rotor and the number of stator teeth amounts to 28:24, 20:24, 32:24 or 14:12.

12. The electric motor according to claim 10, wherein a relation between the number of slots in the rotor and the number of stator teeth amounts to 27:24.

* * * * *